US011897500B2

(12) United States Patent
Mulliner et al.

(10) Patent No.: US 11,897,500 B2
(45) Date of Patent: Feb. 13, 2024

(54) SECURE MANAGEMENT OF DIGITAL AUTHENTICATION INFORMATION FOR AUTONOMOUS VEHICLES

(71) Applicant: GM Cruise Holdings LLC, San Francisco, CA (US)

(72) Inventors: Collin Richard Mulliner, Brooklyn, NY (US); Graziano Giuseppe Misuraca, New York, NY (US)

(73) Assignee: GM Cruise Holdings LLC, San Francisco, CA (US)

( * ) Notice: Subject to any disclaimer, the term of this patent is extended or adjusted under 35 U.S.C. 154(b) by 115 days.

(21) Appl. No.: 17/549,750

(22) Filed: Dec. 13, 2021

(65) Prior Publication Data

US 2023/0182767 A1 Jun. 15, 2023

(51) Int. Cl.
*H04W 12/069* (2021.01)
*G07C 5/00* (2006.01)
*G07C 5/08* (2006.01)
*B60W 60/00* (2020.01)

(52) U.S. Cl.
CPC ........... *B60W 60/001* (2020.02); *G07C 5/008* (2013.01); *G07C 5/085* (2013.01); *H04W 12/069* (2021.01)

(58) Field of Classification Search
CPC ..... B60W 60/001; G07C 5/008; G07C 5/085; H04W 12/069
USPC ......................................................... 701/23
See application file for complete search history.

(56) References Cited

U.S. PATENT DOCUMENTS

| 10,501,055 | B1 | 12/2019 | Yi et al. | |
| 11,184,177 | B2* | 11/2021 | Hutchison | H04L 9/0894 |
| 11,418,337 | B2* | 8/2022 | Ruth | H04L 63/062 |
| 2019/0187971 | A1 | 6/2019 | Wang et al. | |
| 2019/0342275 | A1 | 11/2019 | Olive et al. | |
| 2020/0186333 | A1 | 6/2020 | Schubert et al. | |
| 2020/0211301 | A1 | 7/2020 | Zhang et al. | |
| 2020/0312136 | A1* | 10/2020 | Mondello | H04L 9/3273 |
| 2021/0167956 | A1 | 6/2021 | Stöttinger et al. | |
| 2021/0306141 | A1 | 9/2021 | Ruth et al. | |

FOREIGN PATENT DOCUMENTS

WO 2019097402 A1 5/2019

OTHER PUBLICATIONS

US 11,218,311 B2, 01/2022, Mondello et al. (withdrawn)
Ruth, M., et al., "Secrets Management in a Cloud Agnostic World," 10 pages (Aug. 1, 2019).

* cited by examiner

*Primary Examiner* — Tyler D Paige
(74) *Attorney, Agent, or Firm* — Akona IP PC

(57) ABSTRACT

Systems and methods are provided for managing private digital authentication information, known as secrets, for autonomous vehicles. In particular, systems and methods are provided for automating the acquisition of secrets by autonomous vehicles upon start-up, such that secrets are not stored on autonomous vehicles that are powered down. A secrets manager is installed on each autonomous vehicle that can request sets of secrets at start-up and provide the secrets to various modules in the vehicle. Secrets can be updated centrally and autonomous vehicles can easily access updated secrets.

20 Claims, 7 Drawing Sheets

SECURE MANAGEMENT OF DIGITAL AUTHENTICATION INFORMATION FOR AUTONOMOUS VEHICLES

FIELD OF THE DISCLOSURE

The present disclosure relates generally to autonomous vehicles (AVs) and to systems and methods for security.

BACKGROUND

Autonomous vehicles, also known as self-driving cars, driverless vehicles, and robotic vehicles, are vehicles that use multiple sensors to sense the environment and move without human input. Automation technology in the autonomous vehicles enables the vehicles to drive on roadways and to accurately and quickly perceive the vehicle's environment, including obstacles, signs, and traffic lights. The vehicles can be used to pick up passengers and drive the passengers to selected destinations. The vehicles can also be used to pick up packages and/or other goods and deliver the packages and/or goods to selected destinations.

Strong security safeguards pertaining to autonomous vehicles is important. Autonomous vehicles include many services and applications that use secrets. Secrets is a term that refers to private digital authentication information, such as certificates, passwords, storage account keys, shared access signatures, encryption keys, and decryptions keys. Many secrets have a limited life span and at the end of the life span, the secret expires, becomes invalid, or becomes untrusted. Thus, during operation of systems that use secrets, the secrets are regularly renewed. The secrets are generally managed by a secrets management service, which distributes the secrets.

SUMMARY

Systems and methods are provided for distributing secrets to autonomous vehicles. In particular, systems and methods are provided for automating the acquisition of secrets by autonomous vehicles upon start-up, such that secrets are not stored on autonomous vehicles that are powered down. A secrets manager is installed on each autonomous vehicle that can request sets of secrets at start-up and provide the secrets to various modules in the vehicle. Additionally, the secrets manager can periodically request updated secrets. Thus, secrets can be updated centrally and autonomous vehicles can easily access updated secrets.

According to one aspect, a method for providing secrets to an autonomous vehicle, comprises determining a set of secrets to request at a secrets manager on the autonomous vehicle; transmitting a request from the secrets manager to a secrets authenticator for the set of secrets; identifying, at the secrets authenticator, the autonomous vehicle in a vehicle information database; authenticating the autonomous vehicle at the secrets authenticator, based in part on the identification; receiving, at the secrets manager, the set of secrets from the secrets authenticator; saving, by the secrets manager, the set of secrets in an autonomous vehicle secrets memory; and deleting the set of secrets when the autonomous vehicle is powered down.

In some implementations, the method further comprises transmitting an authentication credential from the secrets manager to the secrets authenticator. In some implementations, authenticating the autonomous vehicle further comprises authenticating based in part of the authentication credential. In some implementations, determining the set of secrets to request further comprises accessing secrets configuration parameters on the autonomous vehicle. In some implementations, the method further comprises allowing autonomous vehicle clients to access selected secrets from the set of secrets. In some implementations, the method further comprises registering clients using the selected secrets. In some implementations, the method further comprises powering down the autonomous vehicle and deleting the set of secrets. In some implementations, obtaining the set of secrets includes obtaining at least one of a certificate, a password, an encryption key, a decryption key, and an authentication key. In some implementations, injecting secrets in the respective autonomous vehicle locations includes storing secrets in at least one volatile memory.

According to another aspect, a cloud-based computing system for injection of secrets to an autonomous vehicle, comprises: a secrets vault configured to store a plurality of secrets for a fleet of vehicles including the autonomous vehicle; a vehicle information database configured to store information about vehicles in the fleet of vehicles including the autonomous vehicle; and a secrets authenticator configured to: receive a secrets request from the autonomous vehicle, access a subset of the plurality of secrets from the secrets vault based on the secrets request and the information from the vehicle information database for the autonomous vehicle; and a secrets manager in the autonomous vehicle configured to: communicate with the secrets authenticator to transmit the secrets request and obtain the subset of the plurality of secrets, and save the subset of the plurality of secrets in an onboard memory.

In some implementations, the system further comprises a secure memory on the autonomous vehicle configured to store an authentication credential, and wherein the secrets manager is further configured to transmit the authentication credential to the secrets authenticator. In some implementations, the secrets authenticator is further configured to authenticate the secrets request. In some implementations, the subset of the plurality of secrets includes at least one of a certificate, a password, an encryption key, a decryption key, and an authentication key. In some implementations, the system further comprises a secrets configuration file, wherein the secrets manager is configured to access the secrets configuration file and determine the subset of the plurality of secrets for the secrets request.

According to another aspect, a method for providing secrets to an autonomous vehicle, comprises: at the autonomous vehicle: determining a set of secrets to request at a secrets manager; transmitting a request for the set of secrets from the secrets manager to a central computing system secrets authenticator; and at the central computing system secrets authenticator: identifying the autonomous vehicle in a vehicle information database; authenticating the autonomous vehicle, based in part on the identification; identifying selected secrets from a secrets vault to fulfill the request; and transmitting the selected secrets to the secrets manager.

In some implementations, the method further comprises, at the autonomous vehicle, transmitting an authentication credential, and wherein, at the central computing system secrets authenticator, authenticating the autonomous vehicle is based in part on the authentication credential. In some implementations, the method further comprises, at the autonomous vehicle, receiving, at the secrets manager, the selected secrets from the secrets authenticator. In some implementations, the method further comprises, at the autonomous vehicle, saving the selected secrets to a memory. In some implementations, the method further comprises, at the autonomous vehicle, accessing at least one selected secret from the memory and registering a device. In some implementations, transmitting the selected secrets includes transmitting at least one of a certificate, a password, an encryption key, a decryption key, and an authentication key.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
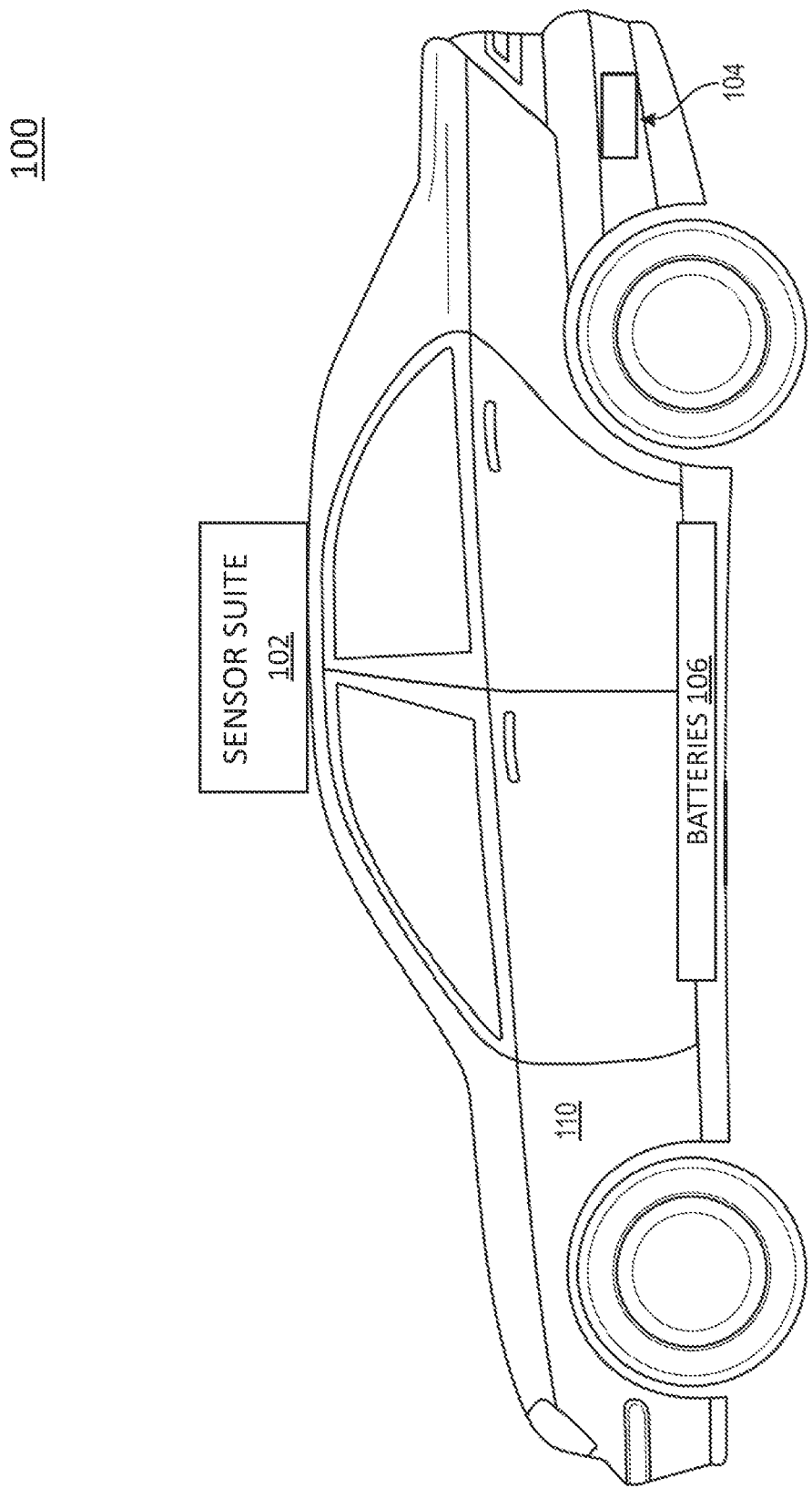
FIG. 1 is a diagram illustrating an autonomous vehicle, according to some embodiments of the disclosure.

Systems and methods are provided for distributing secrets to autonomous vehicles. In particular, systems and methods are provided for automating the acquisition of secrets by autonomous vehicles upon start-up, such that secrets are not stored on autonomous vehicles that are powered down. This provides extra security for the secrets, since the secrets cannot be stolen from a powered-down vehicle. A secrets manager is installed on each autonomous vehicle that can request one or more sets of secrets at start-up and provide the secrets to various modules in the vehicle. Additionally, the secrets manager can periodically request updated secrets. Thus, a central secrets authenticator can update secrets for distribution, and the secrets manager can easily access updated secrets for the autonomous vehicle.

In general, many vehicles currently have hard-coded secrets. That is, many vehicles include secrets that are encoded in source code, build artifacts, firmware, and/or software at manufacture. However, secrets stored in these locations could potentially be accessed by users, hackers, or someone tampering with the vehicle, and thus more secure secrets storage solutions are desirable. Furthermore, if the secrets stored in these locations are centrally updated, in order to update secrets on individual vehicles, each vehicle visits a service center that can access the hard-coded data to update the vehicle's secrets.

In contrast, as described herein, a secrets manager on an autonomous vehicle fetches updated secrets from a remote secrets authenticator store and provides the updated secrets to various modules in the autonomous vehicle. According to various examples, this allows secrets for a fleet of autonomous vehicles to be centrally updated and remotely distributed to the autonomous vehicles in the fleet without a service visit. Secrets, such as certificates, passwords, storage account keys, shared access signatures, encryption keys, decryptions keys, and authentication keys can be securely distributed to autonomous vehicles for use by various services and applications in the autonomous vehicle. For example, if the autonomous vehicles in a fleet use an API (Application Programming Interface) key to communicate with an external service and the external service has a security incident and updates the API key with new credentials, the new API key can be remotely distributed via the central secrets authenticator and the secrets manager on each autonomous vehicle.

According to some implementations, the secrets can be stored in a centralized secrets management location, also known as a secrets vault, which can be accessed by a centralized secrets authenticator. The secrets authenticator may be cloud-based. The secrets authenticator determines which secrets a vehicle may need and accesses the corresponding secrets from the secrets vaults. In particular, the secrets authenticator can access a vehicle information database, which includes information about the vehicle requesting secrets. The information about the vehicle from the vehicle information database indicates to the secrets authenticator which secrets from the secrets vault to retrieve and send the vehicle.

In various examples, each autonomous vehicle in a fleet communicates with the secrets authenticator to access secrets specific to the respective autonomous vehicle. In particular, when a vehicle requests secrets, the secrets authenticator authenticates the vehicle, determines which group of secrets are matched to the vehicle, and provides the corresponding secrets to the vehicle. In this manner, the secrets authenticator provides a way to centrally manage secrets, including adding new secrets, removing secrets, and updating the values of various secrets. Additionally, in some examples, an API may be used to automate secrets management.

A secrets manager on each autonomous vehicle accesses a vehicle configuration parameters that specify which secrets to request from the central secrets authenticator. The secrets manager retrieves secrets and saves them to a memory onboard the autonomous vehicle, where various applications can access the secrets. In some examples, a secrets manager has a data-configurable list of secrets to fetch. In some examples, devices and/or clients on the autonomous vehicle each have a data-configurable list of secrets to fetch, and the secrets are stored in a memory in the autonomous vehicle. In particular, the devices and/or clients do not store the secrets but access the secrets as needed. In various examples, configurable ways to provide secrets to clients on the autonomous vehicle are provided herein. For instance, secrets can be provided through a protocol such as unix domain sockets, representational state transfer (REST), API, and/or a D-Bus protocol. In various examples, systems and methods are provided for refreshing secrets at selected intervals.

In various implementations, in an autonomous vehicle fleet, deployment of software onto many individual instances of vehicles is automated. Furthermore, each vehicle is programmed to enable the vehicle to access various secrets specific to the respective vehicle. However, according to various implementations, each vehicle receives the secrets the respective vehicle uses, and vehicles are not over-authorized. In particular, vehicles are not given access to secrets specific to other vehicles. Additionally, any selected vehicle includes multiple services running on the vehicle, and each service has access to a subset of the secrets the vehicle acquires, where the subset of secrets is specific to service. Not all secrets are available to each service or application running on the vehicle. Thus, according to various implementations, an autonomous vehicle is programmatically enabled access to a superset of secrets from a secrets authenticator, wherein the superset of secrets is determined according to the autonomous vehicle and the services running on the autonomous vehicle. Subsets of the superset of secrets are granularly distributed by a secrets injection tool to individual services running on the autonomous vehicle.

Example Autonomous Vehicle Configured for Secrets Injection

FIG. 1 is a diagram illustrating an autonomous vehicle 110, according to some embodiments of the disclosure. The autonomous vehicle 110 includes a sensor suite 102 and an onboard computer 104. In various examples, the onboard computer 104 includes a secrets manager that requests and receives secrets, and a memory for saving secrets. Various vehicle applications and services can access the secrets in the memory of the onboard computer 104. In various implementations, the autonomous vehicle 110 uses sensor information from the sensor suite 102 to determine its location, to navigate traffic, and to sense and avoid various obstacles. In various examples, the sensor suite 102 includes one or more services or applications that use secrets acquired by the secrets manager.

The sensor suite 102 includes localization and driving sensors. For example, the sensor suite may include one or more of photodetectors, cameras, RADAR, SONAR, LIDAR, GPS, inertial measurement units (IMUs), accelerometers, microphones, strain gauges, pressure monitors, barometers, thermometers, altimeters, wheel speed sensors, and a computer vision system.

In various examples, the sensor suite 102 includes cameras implemented using high-resolution imagers with fixed mounting and field of view. In further examples, the sensor suite 102 includes LIDARs implemented using scanning LIDARs. Scanning LIDARs have a dynamically configurable field of view that provides a point-cloud of the region intended to scan. In still further examples, the sensor suite 102 includes RADARs implemented using scanning RADARs with dynamically configurable field of view.

The autonomous vehicle 110 includes an onboard computer 104, which functions to control the autonomous vehicle 110. The onboard computer 104 processes sensed data from the sensor suite 102 and/or other sensors, in order to determine a state of the autonomous vehicle 110. In some implementations described herein, the autonomous vehicle 110 includes sensors inside the vehicle. Based upon the vehicle state and programmed instructions, the onboard computer 104 controls and/or modifies driving behavior of the autonomous vehicle 110. In various examples, the onboard computer 104 includes a secrets manager, and the secrets manager communicates with a cloud-based secrets authenticator to retrieve secrets used by the autonomous vehicle 110.

The onboard computer 104 functions to control the operations and functionality of the autonomous vehicles 110 and processes sensed data from the sensor suite 102 and/or other sensors in order to determine states of the autonomous vehicles. The onboard computer 104 may receive secrets injections at the secrets manager, which saves the secrets in memory such that the secrets can be accessed by appropriate services. In some implementations, various secrets are stored at specific locations in memory based on where the clients (e.g., devices) that use the secrets will look for the secrets. In some implementations, the onboard computer 104 is a general-purpose computer adapted for I/O communication with vehicle control systems and sensor systems. In some implementations, the onboard computer 104 is any suitable computing device. In some implementations, the onboard computer 104 is connected to the Internet via a wireless connection (e.g., via a cellular data connection). In some examples, the onboard computer 104 is coupled to any number of wireless or wired communication systems. In some examples, the onboard computer 104 is coupled to one or more communication systems via a mesh network of devices, such as a mesh network formed by autonomous vehicles.

According to various implementations, the autonomous driving system of FIG. 1 functions to enable an autonomous vehicle 110 to modify and/or set a driving behavior in response to parameters set by vehicle passengers (e.g., via a passenger interface) and/or other interested parties (e.g., via a vehicle coordinator or a remote expert interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle. In various examples, the autonomous vehicle 110 is a boat, an unmanned aerial vehicle, a driverless car, a golf cart, a truck, a van, a recreational vehicle, a train, a tram, a three-wheeled vehicle, or a scooter. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110 includes a throttle interface that controls an engine throttle, motor speed (e.g., rotational speed of electric motor), or any other movement-enabling mechanism. In various implementations, the autonomous vehicle 110 includes a brake interface that controls brakes of the autonomous vehicle 110 and controls any other movement-retarding mechanism of the autonomous vehicle 110. In various implementations, the autonomous vehicle 110 includes a steering interface that controls steering of the autonomous vehicle 110. In one example, the steering interface changes the angle of wheels of the autonomous vehicle. The autonomous vehicle 110 may additionally or alternatively include interfaces for control of any other vehicle functions, for example, windshield wipers, headlights, turn indicators, air conditioning, etc.

Example Secrets Injection System

Figure 2:
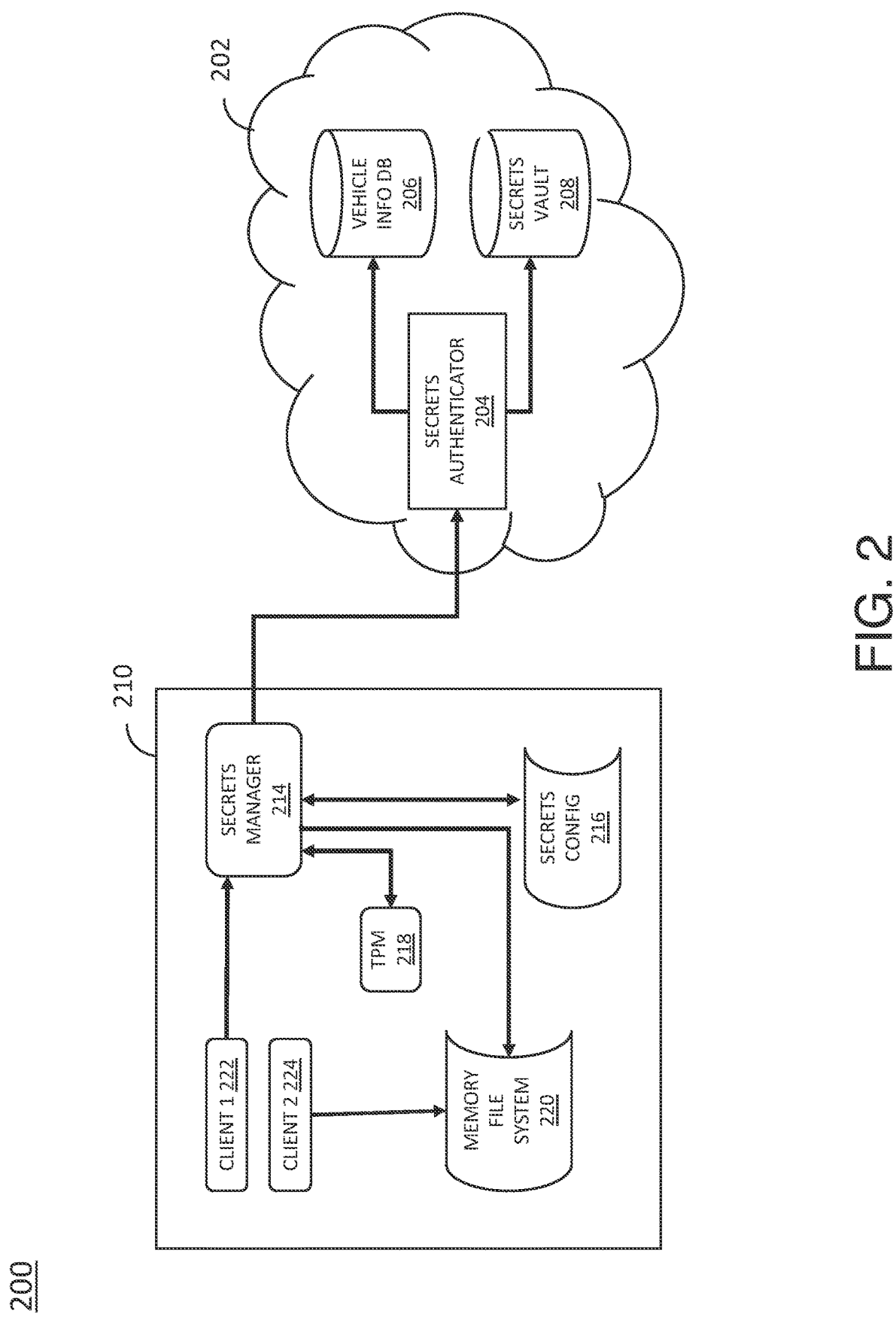
FIG. 2 is a diagram illustrating a secrets authenticator and a secrets manager, according to some embodiments of the disclosure.

FIG. 2 is a diagram 200 illustrating a secrets authenticator 204 and a secrets manager 214, according to various embodiments of the disclosure. The secrets authenticator 204 is in a cloud 202 and the secrets manager 214 is in an autonomous vehicle 210. In various implementations, the system shown in the diagram 200 can be used to register clients (e.g., devices) in the autonomous vehicle. In particular, in various examples, each client in the vehicle has a cryptographic secret available for use. This secret can be used for authentication purposes, allowing the client to securely communicate with other clients and/or to obtain additional secrets for operation. The clients in the autonomous vehicle 210 can obtain these secrets at first boot, or at other times during operation of the autonomous vehicle 210. Clients obtain a certificate that proves trust and ownership of the device through a process called device registration (DR), which is described in greater detail with respect to FIG. 4.

The autonomous vehicle 210 includes the secrets manager 214, secrets configuration parameters 216, a Trusted Platform Module (TPM) 218, a memory file system 220, a first client 222, and a second client 224. In some examples, the secrets manager 214 is software running on the autonomous vehicle 210. The secrets manager 214 retrieves the secrets configuration 216, and transmits a secrets request to the secrets authenticator 204 along with an authorization credential. The authentication credential may be a cryptographic certificate stored in persistent storage with a private key stored in the Trusted Platform Module (TPM) 218 in the autonomous vehicle 210. In various examples, the TPM 218 private key is used to sign or authenticate using the certificate. In various examples, the secrets manager 214 retrieves the cryptographic certificate from persistent storage and the certificate's private key from the TPM 218 and sends the certificate to the secrets authenticator 204 as the authentication credential. In various examples, secrets retrieved by the secrets manager 214 are stored in the memory file system 220. The memory file system 220 can be stored in an onboard computer in the autonomous vehicle 210. The first client 222 and second client 224 can access the memory file system 220 to retrieve secrets. In some examples, the first client 222 and second client 224 can communicate with the secrets manager 214. In particular, the first client 222 and second client 224 may communicate with the secrets manager 214 to request secrets.

The cloud 202 includes the secrets authenticator 204 as well as a vehicle information database 206 and a secrets vault 208. The secrets authenticator 204 can access the vehicle information database 206 as well as a secrets vault 208 to retrieve appropriate secrets for an autonomous vehicle 210. According to various implementations, the secrets authenticator 204 authenticates the autonomous vehicle 210 associated with the secrets request using the authorization credential. In some examples, authentication involves an authentication mechanism in which each vehicle has a unique secret identifier assigned at manufacturing. Each vehicle has a cryptographic certificate which can be used to prove the vehicle is the owner of the unique identifier to a remote service. In some examples, the cryptographic certificate can also be used to prove the vehicle is the owner of its hardware. The cryptographic certificate can be stored in the Trusted Platform Module (TPM) 218 in the autonomous vehicle 210. Thus, the unique secret identifier and cryptographic certificate for each vehicle can be used for secure communication between the secrets manager 214 and the secrets authenticator 204. In some examples, the unique secret identifier and cryptographic certificate can be used to communicate with an autonomous vehicle registration service. In some examples, the secrets authenticator 204 and the secrets manager 214 transmit and receive communications wirelessly.

To retrieve secrets requested by the secrets manager 214, the secrets authenticator 204 accesses the vehicle information database 206 and the secrets vault 208. According to various examples, the secrets vault 208 is a database containing the secrets for vehicles in an autonomous vehicle fleet. The vehicle information database 206 contains information about each vehicle in a fleet. In some examples, the autonomous vehicle 210 is identified based on its Vehicle Identification Number (VIN). In some examples, the autonomous vehicle 210 is identified based on a unique secret identifier assigned at manufacturing, discussed above. According to various examples, the secrets available to a particular vehicle can depend on the make and model of the vehicle as well as the market in which the vehicle is operating. Once the vehicle information is determined from the vehicle information database 206, the secrets authenticator 204 can retrieve the corresponding secrets from the secrets vault 208.

In some examples, the vehicle information database 206 includes database subsets for different subsets of an autonomous vehicle fleet. For example, one subset can include vehicles of a certain make and model that are operating in a select market (e.g., a certain operational city or geographical area). Vehicles of the same make and model operating in a different market can be in a separate subset of the vehicle information database 206. Similarly, vehicles that are a different make and model operating in the same market can be in a separate subset of the vehicle information database 206. In some examples, if a vehicle is moved from a first market to a second market, the subset of the database the vehicle is assigned to is updated to such that the vehicle is assigned to the database subset for the second market.

In some implementations, the vehicle information database 206 includes vehicle information for each make/model of autonomous vehicle. In some examples, there is different information in the database for each city and/or market in which a fleet of autonomous vehicles operates. In some examples, there is a specific vehicle information for vehicles of a certain make/model of vehicle operating in a particular city or geographical area. The secrets authenticator accesses the appropriate vehicle information for a vehicle and determines which secrets from the secrets vault the vehicle should receive. The secrets authenticator accesses the corresponding secrets in the secrets vault for the vehicle. In some examples, a vehicle can move from one city and/or fleet to another city and/or autonomous vehicle fleet, and the vehicle's database entry is updated to reflect its current city and/or autonomous vehicle fleet. The secrets for the vehicle can change depending on the city and/or autonomous vehicle fleet and the secrets authenticator determines which secrets to retrieve based on the vehicle information. For instance, if a vehicle is moved from a first market to a second market, the vehicle information is updated to reflect its current placement in the second market.

In some examples, each operational city can have a different password or set of secrets. In some examples, different types of vehicles can have different passwords or types of passwords, and a different set of secrets. By identifying which secrets to provide to a vehicle based on its model and operating city, the coding of a vehicle can be remotely updated without any direct access to the vehicle. In some examples, the secrets authenticator 204 provides secrets from the secrets vault 208 to vehicles that are registered in the vehicle information database 206.

Example Secrets Injection Methods

Figure 3:
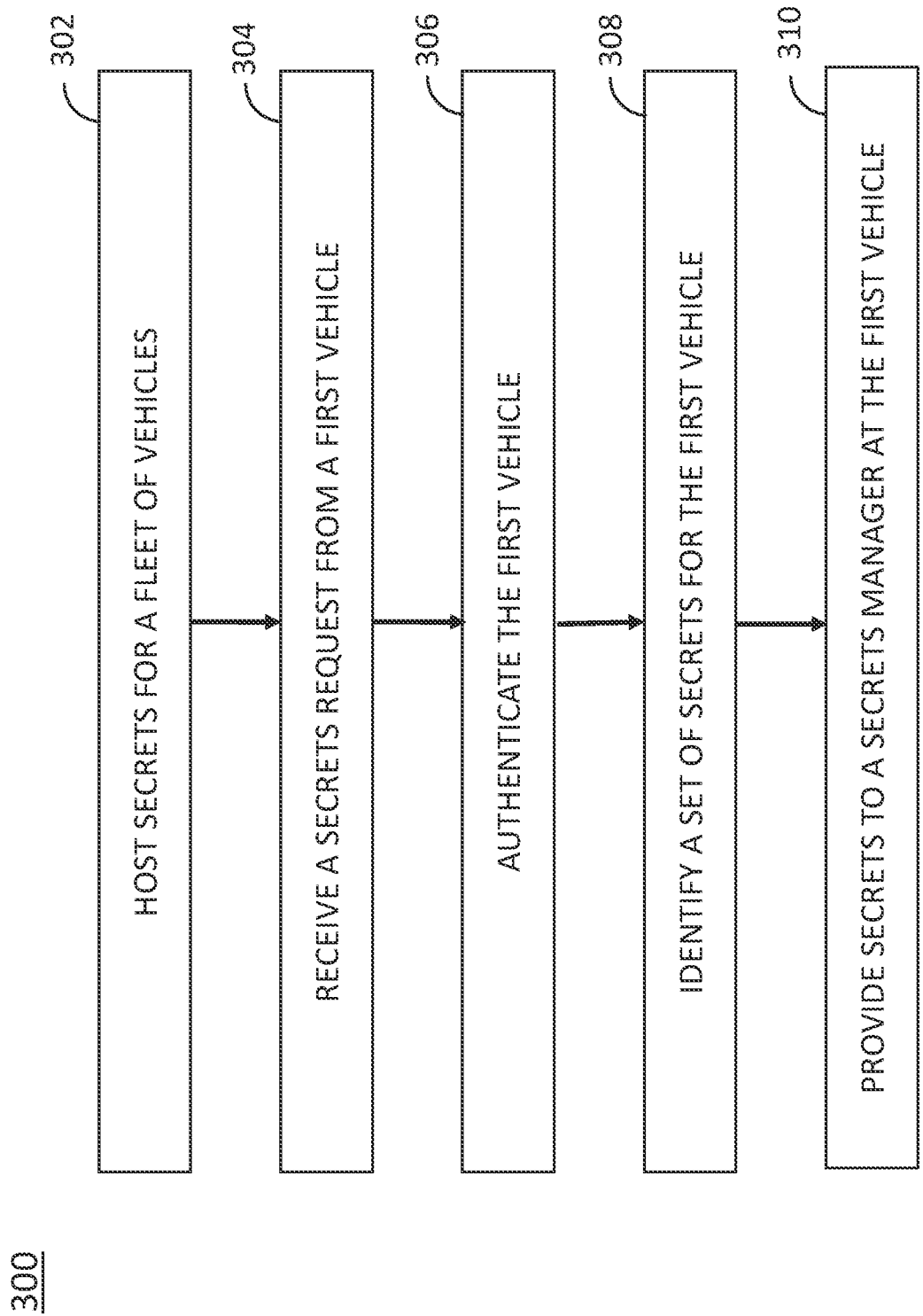
FIG. 3 is a flow chart illustrating a method of for providing secrets to autonomous vehicles in a fleet, according to some embodiments of the disclosure.

FIG. 3 is a flow chart illustrating a method 300 for an autonomous vehicle fleet central computer to provide secrets to autonomous vehicles in the fleet, according to various embodiments of the invention. At step 302, secrets that the vehicles may request are stored in a secrets vault accessible to a secrets authenticator. The secrets authenticator and the secrets vault can be cloud-based and the secrets authenticator and the secrets vault can be in a central computer. Referring to FIG. 2, the secrets authenticator 204 can access a secrets vault 208 storing the secrets. At step 304, a secrets request for a first vehicle is received from a secrets manager at the first vehicle. The secrets request is received at the secrets authenticator. The secrets request can be a request for a set of secrets and it can be a request for a specific secret.

At step 306, the first vehicle is authenticated, to ensure that the received secrets request is authentic. In some examples, as described above, the secrets request includes an authorization credential, and authentication at the secrets authenticator uses the authentication credential. In some examples, the secrets request includes a unique secret identifier assigned to the first vehicle and a cryptographic certificate that can be used to prove the vehicle is the owner of the unique identifier. The secrets authenticator uses the received authentication data to authenticate the first vehicle.

At step 308, a set of secrets for the first vehicle is identified. In particular, the secrets authenticator identifies the set of secrets. In various examples, the secrets authenticator identifies the set of secrets by identifying the make and model of the vehicle as well as the vehicle's operational city and the secrets authenticator locates the vehicle information in a vehicle information database. Based on the vehicle information retrieved from the vehicle information database, the secrets authenticator identifies and accesses the set of secrets for the first vehicle in a secrets vault. At step 310, the secrets authenticator provides the set of secrets to a secrets manager at the first vehicle.

Figure 4:
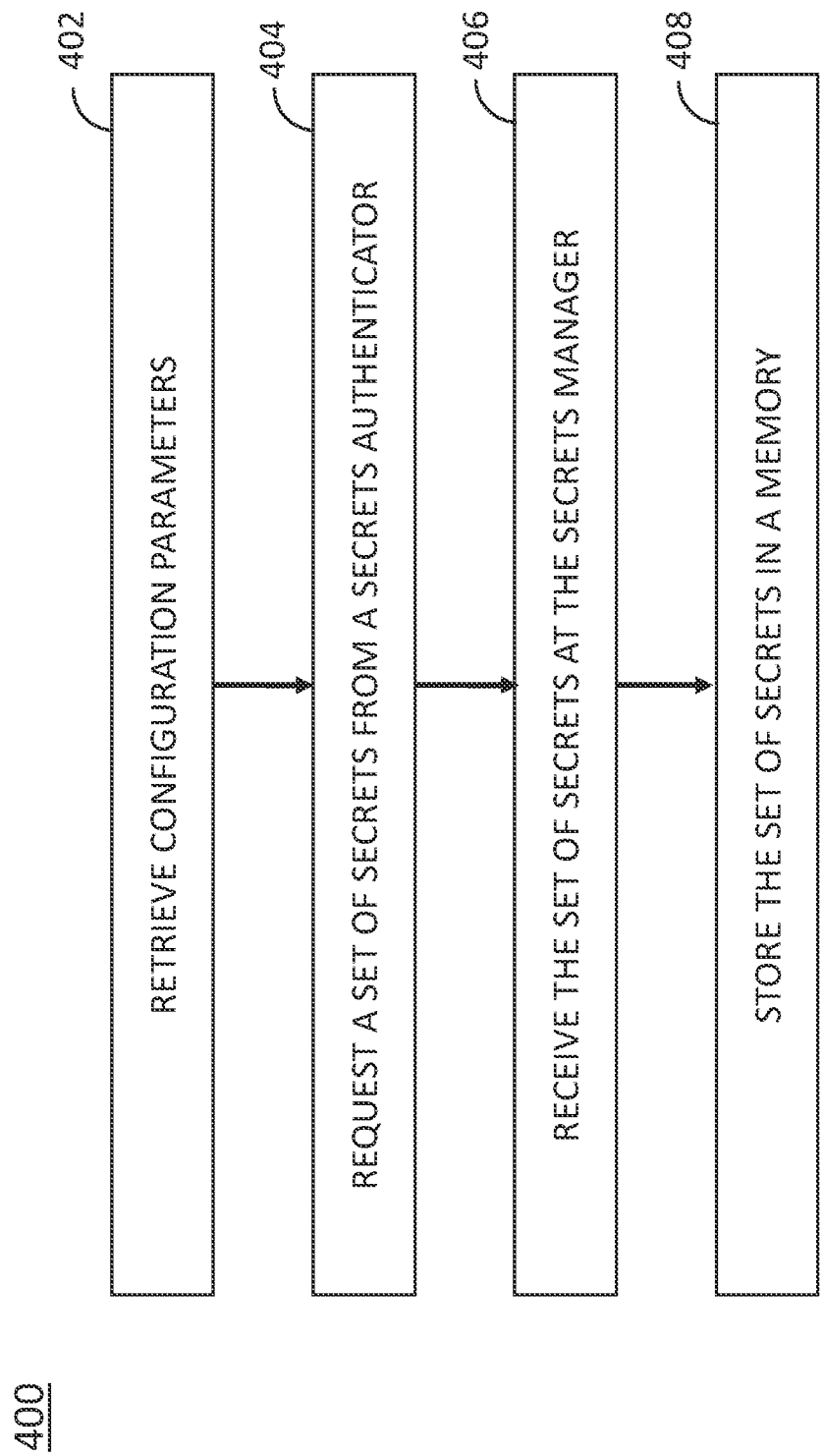
FIG. 4 is a flow chart illustrating a method of for an autonomous vehicle to request secrets from a central computer, according to some embodiments of the disclosure.

FIG. 4 is a flow chart illustrating a method 400 for an autonomous vehicle to request secrets from a secrets authenticator, according to various embodiments of the invention. At step 402, a secrets manager in the autonomous vehicle retrieves configuration parameters stored on the autonomous vehicle. At step 404, the secrets manager requests a set of secrets from a secrets authenticator, wherein the secrets authenticator is a cloud-based secrets authenticator and the secrets authenticator may be located at a central computer. In some examples, the secrets manager communicates with the secrets authenticator over a TLS (Transport Layer Security) connection. In various examples, the secrets manager in an autonomous vehicle requests a set of secrets from the secrets authenticator each time a vehicle is started, each time a vehicle is charged, and/or each time a vehicle returns to a service center. In some examples, the secrets manager periodically requests one or more secrets (e.g., hourly, or daily). In some examples, the secrets manager requests updates for some secrets more frequently than other secrets.

At step 406, the set of secrets is received at the secrets manager on the autonomous vehicle. At step 408, the set of secrets is stored in a memory on the autonomous vehicle. In some examples, subsets of the secrets are stored in different memory storage locations. In some examples, the secrets manager has a temporary storage location for storing the received set of secrets, and the secrets manager injects the temporarily stored secrets in various memory locations where various autonomous vehicle clients (e.g., devices) expect the secrets to be stored. In some examples, the secrets reside in one or more memory addresses or databases. In various examples, the secrets reside in volatile storage locations, where volatile storage is ephemeral, and expires regularly. In some examples volatile storage expires when a vehicle is turned off or powered down and/or at regular intervals (e.g., hourly, daily). Some volatile storage locations expire when the vehicle completes a task, such as when the vehicle completes a route. In some examples, the secrets reside at various locations in the onboard computer of the autonomous vehicle.

In some examples, the method 400 can be used for device registration for various devices and/or clients in an autonomous vehicle. In some examples, when an autonomous vehicle device needs a device registration certificate, the device generates a public/private keypair and a CSR (Certificate Signing Request) based on the public/private key pair. The device may store the private key in secure hardware, such as a TPM (e.g., TPM 218 of FIG. 2. The device may extract unique identifying information about itself and other devices in the autonomous vehicle. In some examples, the unique identifying information is called trace data. The device bundles up the CSR along with the trace data and sends the bundle to a device registration server. The device registration server validates the trace data and returns a signed certificate.

After device registration is complete, the device can use the signed certificate to authenticate to other devices and services. In particular, on each boot, the device may obtain session keys from the secrets manager, which obtains the session keys from a secrets authenticator, by providing its device registration certificate. Using the signed certificate to obtain session keys is called session registration. In various examples session registration generates session keys, and session keys can expire after a select period of time. In some examples, session keys expire every 24 hours.

Figure 5:
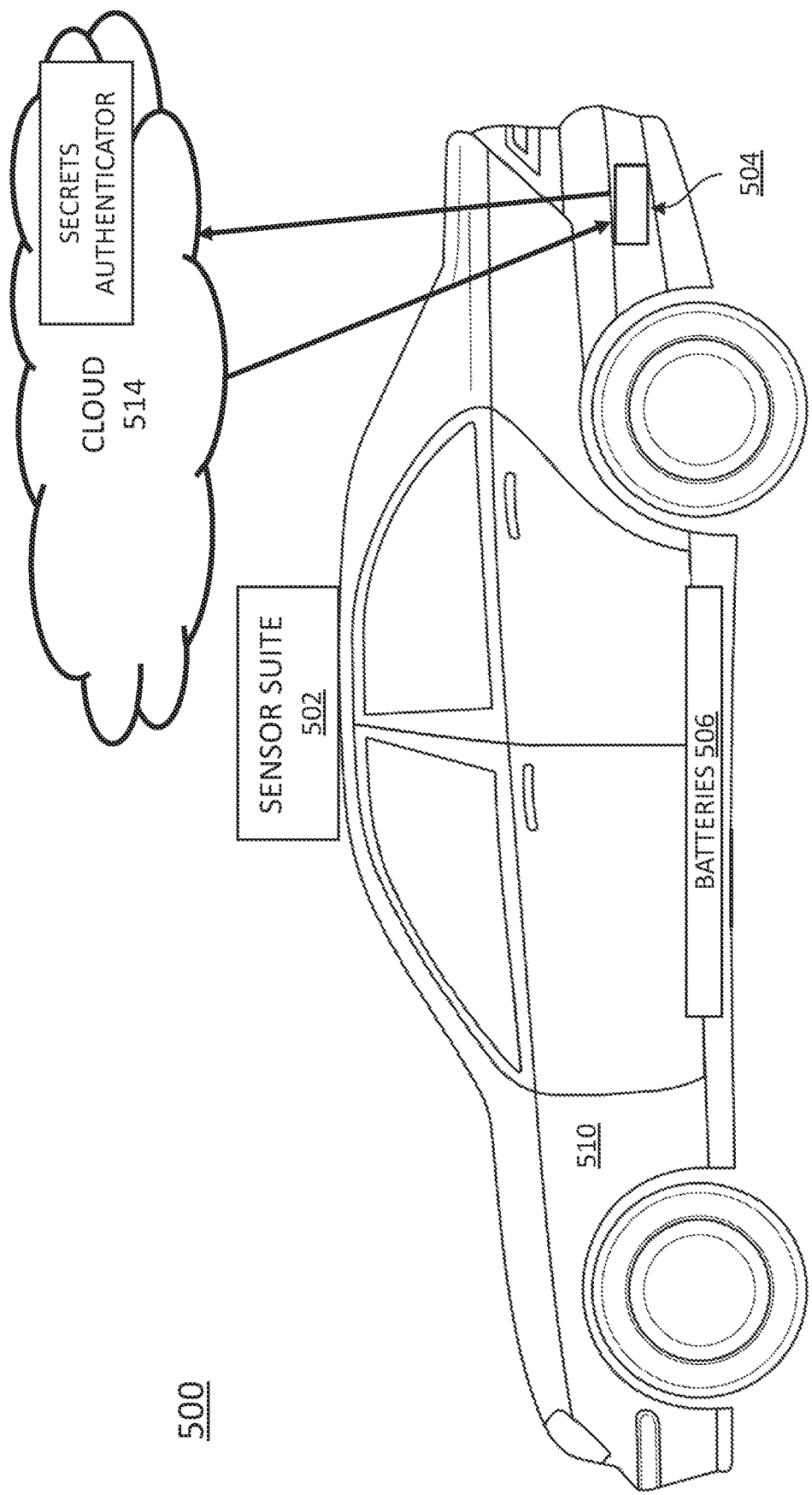
FIG. 5 is a diagram illustrating an autonomous vehicle communicating with a cloud, according to some embodiments of the disclosure.

FIG. 5 is a diagram illustrating an autonomous vehicle 510 communicating with a cloud 514, according to various implementations of the disclosure. The autonomous vehicle 510 includes an onboard computer 504, and the onboard computer 504 communicates wirelessly with the cloud 514. According to various examples, the onboard computer 504 includes a secrets manager, as described above. The cloud 514 includes a secrets authenticator. The secrets manager communicates with the secrets authenticator to transmit authentication credentials, and the secrets authenticator transmits respective secrets to the secrets manager. The secrets manager can inject received secrets to any selected location in the autonomous vehicle. In some examples, the secrets manager injects secrets in the sensor suite 502.

According to various implementations, each autonomous vehicle receives different secrets, different usernames, different passwords, and different credentials from other autonomous vehicles. In some examples, some secrets are shared with multiple vehicles, and some secrets are unique to a particular autonomous vehicle.

Example of an Autonomous Vehicle Fleet

Figure 6:
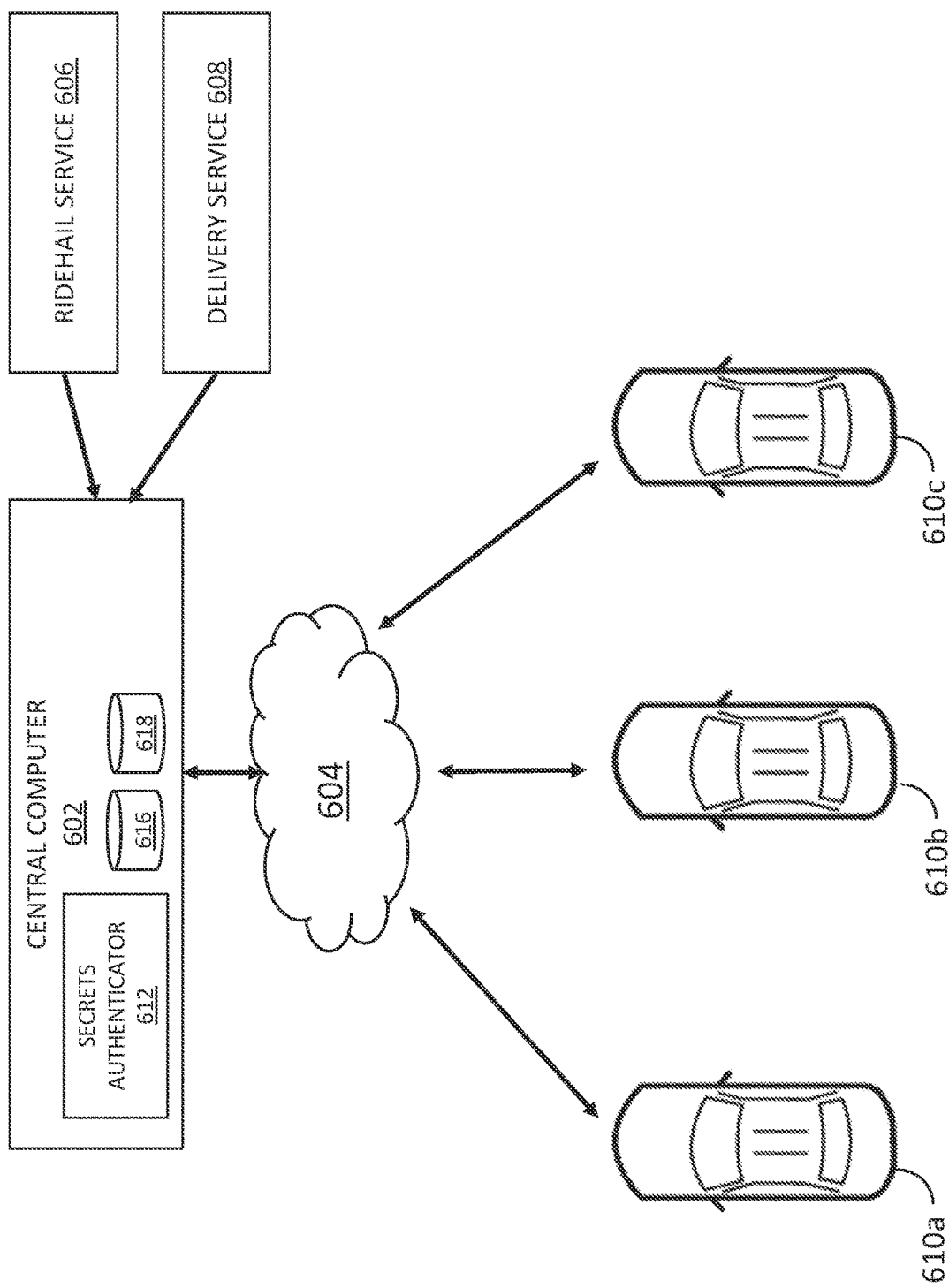
FIG. 6 is a diagram illustrating an autonomous vehicle fleet and a secrets authenticator, according to some embodiments of the disclosure.

FIG. 6 is a diagram 600 illustrating a fleet of autonomous vehicles 610a, 610b, 610c in communication with a central computer 602, according to some embodiments of the disclosure. The vehicles 610a-610c communicate wirelessly with a cloud 604 and a central computer 602. In some examples, the central computer 602 is cloud-based. In various implementations, the central computer 602 may include a secrets authenticator 612, as described herein, as well as a vehicle information database 206 and a secrets vault 208. Thus, the central computer 602 can be used to provide secrets to secrets managers in each of the vehicles 610a-610c via the secrets authenticator 612. The central computer 602 includes a routing coordinator and a database of information from the vehicles 610a-610c in the fleet.

Autonomous vehicle fleet routing refers to the routing of multiple vehicles in a fleet. The central computer 602 also acts as a centralized ride management system and communicates with ridehail users via a ridehail service 606. Via the ridehail service 606, the central computer 602 receives ride requests from various user ridehail applications. Additionally, the central computer 602 may act as a centralized delivery management system and communicate with delivery system users via a delivery service 608. Via the delivery service 608, the central computer 602 receives delivery requests from various user delivery applications. In some implementations, the autonomous vehicles 610a-610c communicate directly with each other.

When a ride request is entered at a ridehail service 606, the ridehail service 606 sends the request to central computer 602. The central computer 602 selects the vehicle 610a-610c to fulfill the request and a route for the vehicle 610a-610c is generated by the routing coordinator. In other examples, the route for the vehicle 610a-610c is generated by the onboard computer on the autonomous vehicle. Each of the autonomous vehicles 61a0-610c is configured to request and receive secrets from the secrets authenticator 612 in the central computer 602 as described in the methods 300 and 400 of FIGS. 3 and 4, respectively. In some examples, the vehicles 610a-610c communicate with the central computer 602 via the cloud 604.

In some examples, the central computer 602 communicates with the onboard computer of a selected autonomous vehicle 610a-610c and provides information to allow a ridehail service 606 or a delivery service 608 to interface with the autonomous vehicle 610a-610c. In various implementations, the autonomous vehicle 610a-610c is authenticated with the ridehail service 606 or the delivery service 608. In some examples, configuration parameters are provided to the autonomous vehicle 610a-610c by the central computer 602, to allow the autonomous vehicle 610a-610c to interface with the ridehail service 606 or delivery service 608. According to various implementations, the configuration parameters allow the autonomous vehicle 610a-610c to acquire one or more secrets from the secrets authenticator 612 related to the ridehail or delivery request from the ridehail service 606 or delivery service 608.

In some implementations, once a delivery arrives at a drop-off location, the autonomous vehicle 610a-610c onboard computer initiates a delivery verification system to collect evidence of delivery of the package, for example by using a camera on the autonomous vehicle 610a-610c to take a picture of the delivery at its delivery location. In some examples, the verification uses one or more secrets from the secrets authenticator 612 to securely communicate the verification from the autonomous vehicle 610a-610 to the delivery service 608. Similarly, in some implementations, once a passenger arrives at a drop-off location, the autonomous vehicle 610a-610c onboard computer initiates a drop-off verification system to collect evidence of drop-off of the passenger, for example by using a camera on the autonomous vehicle 610a-610c to take a picture of the passenger exiting and/or walking away from the vehicle 610a-610c. In some examples, the verification uses one or more secrets from the secrets authenticator 612 to securely communicate the verification from the autonomous vehicle 610a-610c to the ridehail service 606.

As described above, each vehicle 610a-610c in the fleet of vehicles communicates with a routing coordinator. Thus, information gathered by various autonomous vehicles 610a-610c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle.

In some examples, the vehicles 610a-610c generate and update routes to selected destinations. In various examples, the vehicles 610a-610c include routing generation clients that use secrets. In some examples, the routing generation client secrets depend on the operational city or geographic area in which the vehicle 610a-610c is driving. A secrets manager on each of the vehicles 610a-610c can request and receive the relevant secrets from the secrets authenticator 612. According to various implementations, a set of parameters can be established that determine which metrics are considered (and to what extent) in determining routes or route modifications. For example, expected congestion or traffic based on a known event can be considered. Generally, a routing goal refers to, but is not limited to, one or more desired attributes of a routing plan indicated by at least one of an administrator of a routing server and a user of the autonomous vehicle.

Routing goals may be specific or general in terms of both the vehicles they are applied to and over what timeframe they are applied. As an example of routing goal specificity in vehicles, a routing goal may apply only to a specific vehicle, or to all vehicles in a specific region, or to all vehicles of a specific type, etc. Routing goal timeframe may affect both when the goal is applied (e.g., some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles. In various examples, the vehicles 610a-610c can retrieve various routing goals from the central computer 602.

Some examples of routing goals include goals involving trip duration (either per trip, or average trip duration across some set of vehicles and/or times), physics, laws, and/or company policies (e.g., adjusting routes chosen by users that end in lakes or the middle of intersections, refusing to take routes on highways, etc.), distance, velocity (e.g., max., min., average), source/destination (e.g., it may be optimal for vehicles to start/end up in a certain place such as in a pre-approved parking space or charging station), intended arrival time (e.g., when a user wants to arrive at a destination), duty cycle (e.g., how often a car is on an active trip vs. idle), energy consumption (e.g., gasoline or electrical energy), maintenance cost (e.g., estimated wear and tear), money earned (e.g., for vehicles used for ridehailing), person-distance (e.g., the number of people moved multiplied by the distance moved), occupancy percentage, higher confidence of arrival time, user-defined routes or waypoints, fuel status (e.g., how charged a battery is, how much gas is in the tank), passenger satisfaction (e.g., meeting goals set by or set for a passenger) or comfort goals, environmental impact, toll cost, etc. In examples where vehicle demand is important, routing goals may include attempting to address or meet vehicle demand.

Routing goals may be combined in any manner to form composite routing goals; for example, a composite routing goal may attempt to optimize a performance metric that takes as input trip duration, ridehail revenue, and energy usage and also, optimize a comfort metric. The components or inputs of a composite routing goal may be weighted differently and based on one or more routing coordinator directives and/or passenger preferences.

Likewise, routing goals may be prioritized or weighted in any manner. For example, a set of routing goals may be prioritized in one environment, while another set may be prioritized in a second environment. As a second example, a set of routing goals may be prioritized until the set reaches threshold values, after which point a second set of routing goals takes priority. Routing goals and routing goal priorities may be set by any suitable source (e.g., an autonomous vehicle routing platform, an autonomous vehicle passenger).

The routing coordinator uses maps to select an autonomous vehicle from the fleet to fulfill a ride request. In some implementations, the routing coordinator sends the selected autonomous vehicle the ride request details, including pick up location and destination location, and an onboard computer on the selected autonomous vehicle generates a route and navigates to the destination. In some implementations, the routing coordinator in the central computing system 602 generates a route for each selected autonomous vehicle 610a-610c, and the routing coordinator determines a route for the autonomous vehicle 610a-610c to travel from the autonomous vehicle's current location to a first destination.

Example of a Computing System for Secrets

Figure 7:
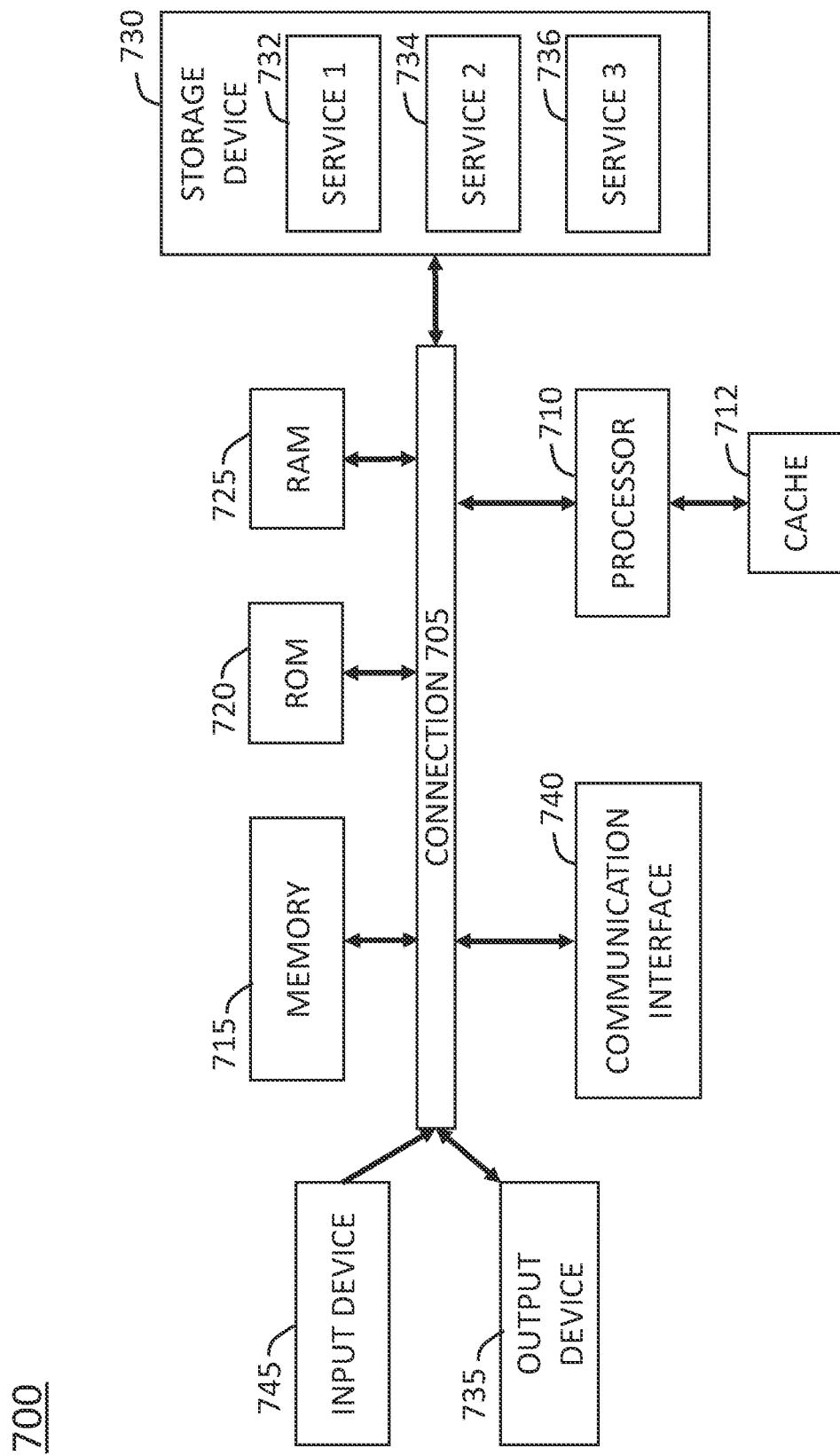
FIG. 7 shows an example embodiment of a system for implementing certain aspects of the present technology.

FIG. 7 shows an example embodiment of a computing system 700 for implementing certain aspects of the present technology. In various examples, the computing system 700 can be any computing device making up the onboard computer 104, the central computer 602, a secrets authenticator 204, or any other computing system described herein. The computing system 700 can include any component of a computing system described herein which the components of the system are in communication with each other using connection 705. The connection 705 can be a physical connection via a bus, or a direct connection into processor 710, such as in a chipset architecture. The connection 705 can also be a virtual connection, networked connection, or logical connection.

In some implementations, the computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

The example computing system 700 includes at least one processing unit (CPU or processor) 710 and a connection 705 that couples various system components including system memory 715, such as read-only memory (ROM) 720 and random access memory (RAM) 725 to processor 710. The computing system 700 can include a cache of high-speed memory 712 connected directly with, in close proximity to, or integrated as part of the processor 710.

The processor 710 can include any general-purpose processor and a hardware service or software service, such as services 732, 734, and 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction, the computing system 700 includes an input device 745, which can represent any number of input mechanisms, such as a microphone for speech, a touch-sensitive screen for gesture or graphical input, keyboard, mouse, motion input, speech, etc. The computing system 700 can also include an output device 735, which can be one or more of a number of output mechanisms known to those of skill in the art. In some instances, multimodal systems can enable a user to provide multiple types of input/output to communicate with the computing system 700. The computing system 700 can include a communications interface 740, which can generally govern and manage the user input and system output. There is no restriction on operating on any particular hardware arrangement, and therefore the basic features here may easily be substituted for improved hardware or firmware arrangements as they are developed.

A storage device 730 can be a non-volatile memory device and can be a hard disk or other types of computer-readable media which can store data that are accessible by a computer, such as magnetic cassettes, flash memory cards, solid state memory devices, digital versatile disks, cartridges, RAMs, ROM, and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as a processor 710, a connection 705, an output device 735, etc., to carry out the function.

As discussed above, each vehicle in a fleet of vehicles communicates with a routing coordinator. When a vehicle is flagged for service, the routing coordinator schedules the vehicle for service and routes the vehicle to the service center. When the vehicle is flagged for maintenance, a level of importance or immediacy of the service can be included. As such, service with a low level of immediacy will be scheduled at a convenient time for the vehicle and for the fleet of vehicles to minimize vehicle downtime and to minimize the number of vehicles removed from service at any given time. In some examples, the service is performed as part of a regularly-scheduled service. Service with a high level of immediacy may require removing vehicles from service despite an active need for the vehicles. In some examples, an autonomous vehicle service includes service to the autonomous vehicle's secrets injection tool.

Routing goals may be specific or general in terms of both the vehicles they are applied to and over what timeframe they are applied. As an example of routing goal specificity in vehicles, a routing goal may apply only to a specific vehicle, or to all vehicles of a specific type, etc. Routing goal timeframe may affect both when the goal is applied (e.g., urgency of the goal, or, some goals may be 'active' only during set times) and how the goal is evaluated (e.g., for a longer-term goal, it may be acceptable to make some decisions that do not optimize for the goal in the short term, but may aid the goal in the long term). Likewise, routing vehicle specificity may also affect how the goal is evaluated; e.g., decisions not optimizing for a goal may be acceptable for some vehicles if the decisions aid optimization of the goal across an entire fleet of vehicles.

In various implementations, the routing coordinator is a remote server or a distributed computing system connected to the autonomous vehicles via an Internet connection. In some implementations, the routing coordinator is any suitable computing system. In some examples, the routing coordinator is a collection of autonomous vehicle computers working as a distributed system.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Select Examples

Example 1 provides a method for providing secrets to an autonomous vehicle, comprising: determining a set of secrets to request at a secrets manager on the autonomous vehicle; transmitting a request from the secrets manager to a secrets authenticator for the set of secrets; identifying, at the secrets authenticator, the autonomous vehicle in a vehicle information database; authenticating the autonomous vehicle at the secrets authenticator, based in part on the identification; receiving, at the secrets manager, the set of secrets from the secrets authenticator; saving, by the secrets manager, the set of secrets in an autonomous vehicle secrets memory; and deleting the set of secrets when the autonomous vehicle is powered down.

Example 2 provides a method according to any of the preceding and/or following examples, further comprising transmitting an authentication credential from the secrets manager to the secrets authenticator.

Example 3 provides a method according to any of the preceding and/or following examples, wherein authenticating the autonomous vehicle further comprises authenticating based in part of the authentication credential.

Example 4 provides a method according to any of the preceding and/or following examples, wherein determining the set of secrets to request further comprises accessing secrets configuration parameters on the autonomous vehicle.

Example 5 provides a method according to any of the preceding and/or following examples, further comprising allowing autonomous vehicle clients to access selected secrets from the set of secrets.

Example 6 provides a method according to any of the preceding and/or following examples, further comprising registering clients using the selected secrets.

Example 7 provides a method according to any of the preceding and/or following examples, further comprising powering down the autonomous vehicle and deleting the set of secrets.

Example 8 provides a method according to any of the preceding and/or following examples, wherein obtaining the set of secrets includes obtaining at least one of a certificate, a password, an encryption key, a decryption key, and an authentication key.

Example 9 provides a method according to any of the preceding and/or following examples, wherein injecting secrets in the respective autonomous vehicle locations includes storing secrets in at least one volatile memory.

Example 10 provides a method according to any of the preceding and/or following examples, wherein the volatile memory expires with an occurrence of an event, and wherein the event includes at least one of: the autonomous vehicle is turned off, the autonomous vehicle is serviced, the autonomous vehicle is charged, and the autonomous vehicle completes a route.

Example 11 provides a cloud-based computing system for injection of secrets to an autonomous vehicle, comprising: a secrets vault configured to store a plurality of secrets for a fleet of vehicles including the autonomous vehicle; a vehicle information database configured to store information about vehicles in the fleet of vehicles including the autonomous vehicle; and a secrets authenticator configured to: receive a secrets request from the autonomous vehicle, access a subset of the plurality of secrets from the secrets vault based on the secrets request and the information from the vehicle information database for the autonomous vehicle; and a secrets manager in the autonomous vehicle configured to: communicate with the secrets authenticator to transmit the secrets request and obtain the subset of the plurality of secrets, and save the subset of the plurality of secrets in an onboard memory.

Example 12 provides a system according to any of the preceding and/or following examples, further comprising a secure memory on the autonomous vehicle configured to store an authentication credential, and wherein the secrets manager is further configured to transmit the authentication credential to the secrets authenticator.

Example 13 provides a system according to any of the preceding and/or following examples, wherein the secrets authenticator is further configured to authenticate the secrets request.

Example 14 provides a system according to any of the preceding and/or following examples, wherein the subset of the plurality of secrets includes at least one of a certificate, a password, an encryption key, a decryption key, and an authentication key.

Example 15 provides a system according to any of the preceding and/or following examples, further comprising a secrets configuration file, wherein the secrets manager is configured to access the secrets configuration file and determine the subset of the plurality of secrets for the secrets request.

Example 16 provides a method for providing secrets to an autonomous vehicle, comprising: at the autonomous vehicle: determining a set of secrets to request at a secrets manager; transmitting a request for the set of secrets from the secrets manager to a central computing system secrets authenticator; and at the central computing system secrets authenticator: identifying the autonomous vehicle in a vehicle information database; authenticating the autonomous vehicle, based in part on the identification; identifying selected secrets from a secrets vault to fulfill the request; and transmitting the selected secrets to the secrets manager.

Example 17 provides a method according to any of the preceding and/or following examples, further comprising, at the autonomous vehicle, transmitting an authentication credential, and wherein, at the central computing system secrets authenticator, authenticating the autonomous vehicle is based in part on the authentication credential.

Example 18 provides a method according to any of the preceding and/or following examples, further comprising, at the autonomous vehicle, receiving, at the secrets manager, the selected secrets from the secrets authenticator.

Example 19 provides a method according to any of the preceding and/or following examples, further comprising, at the autonomous vehicle, saving the selected secrets to a memory.

Example 20 provides a method according to any of the preceding and/or following examples, further comprising, at the autonomous vehicle, accessing at least one selected secret from the memory and registering a device.

Example 21 provides a method according to any of the preceding and/or following examples, wherein transmitting the selected secrets includes transmitting at least one of a certificate, a password, an encryption key, a decryption key, and an authentication key.

Variations and Implementations

As will be appreciated by one skilled in the art, aspects of the present disclosure, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The preceding disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for providing secrets to an autonomous vehicle, comprising:
    determining a set of secrets to request at a secrets manager on the autonomous vehicle, wherein respective secrets of the set of secrets each include private digital authentication information for accessing a respective device in the autonomous vehicle, wherein each respective device has a data-configurable list of secrets to fetch;
    transmitting a request from the secrets manager on the autonomous vehicle to a cloud-based central secrets authenticator for the set of secrets, wherein the cloud-based central secrets authenticator is configured to provide secrets to a fleet of vehicles including the autonomous vehicle;
    identifying, at the cloud-based central secrets authenticator, the autonomous vehicle in a vehicle information database;
    authenticating the autonomous vehicle at the cloud-based central secrets authenticator, based in part on the identification;
    receiving, at the secrets manager on the autonomous vehicle, the set of secrets from the cloud-based central secrets authenticator;
    saving, by the secrets manager, the set of secrets in an autonomous vehicle secrets memory;
    providing access to respective secrets of the set of secrets to the respective devices in the autonomous vehicle, wherein the respective devices can access the respective secrets in the autonomous vehicle secrets memory; and
    deleting the set of secrets from the autonomous vehicle secrets memory when the autonomous vehicle is powered down.

2. The method of claim 1, further comprising transmitting an authentication credential from the secrets manager to the secrets authenticator, wherein the authentication credential includes a cryptographic certificate stored in persistent storage and a private key.

3. The method of claim 2, wherein authenticating the autonomous vehicle further comprises authenticating based in part on the authentication credential.

4. The method of claim 1, wherein determining the set of secrets to request further comprises accessing secrets configuration parameters on the autonomous vehicle.

5. The method of claim 1, further comprising allowing autonomous vehicle clients to access selected secrets from the set of secrets.

6. The method of claim 5, further comprising registering clients using the selected secrets.

7. The method of claim 1, further comprising powering down the autonomous vehicle.

8. The method of claim 1, wherein obtaining the set of secrets includes obtaining at least one of a certificate, a password, an encryption key, a decryption key, and an authentication key.

9. The method of claim 1, further comprising injecting secrets in respective autonomous vehicle locations, including storing secrets in at least one volatile memory.

10. A cloud-based computing system for injection of secrets to an autonomous vehicle, comprising:
    a secrets vault configured to store a plurality of secrets for a fleet of vehicles including the autonomous vehicle, wherein respective secrets of the plurality of secrets each include private digital authentication information for accessing a respective client in the autonomous vehicle;
    a vehicle information database configured to store information about vehicles in the fleet of vehicles including the autonomous vehicle; and a cloud-based secrets authenticator configured to provide secrets to the fleet of vehicles including the autonomous vehicle, and further configured to:
  receive a secrets request from the autonomous vehicle,
  access a subset of the plurality of secrets from the secrets vault based on the secrets request and the information from the vehicle information database for the autonomous vehicle; and
a secrets manager in the autonomous vehicle configured to:
  communicate with the cloud-based secrets authenticator to transmit the secrets request and obtain the subset of the plurality of secrets,
  save the subset of the plurality of secrets in an onboard memory,
  provide access to respective secrets of the subset of secrets to respective clients in the autonomous vehicle, wherein the respective clients can access the respective secrets in the onboard memory, and
  delete the subset of the plurality secrets from the onboard memory when the autonomous vehicle is powered down.

11. The system of claim 10, further comprising a secure memory on the autonomous vehicle configured to store an authentication credential, and wherein the secrets manager is further configured to transmit the authentication credential to the cloud-based secrets authenticator.

12. The system of claim 11, wherein the cloud-based secrets authenticator is further configured to authenticate the secrets request.

13. The system of claim 10, wherein the subset of the plurality of secrets includes at least one of a certificate, a password, an encryption key, a decryption key, and an authentication key.

14. The system of claim 10, further comprising a secrets configuration file, wherein the secrets manager is configured to access the secrets configuration file and determine the subset of the plurality of secrets for the secrets request.

15. A method for providing secrets to an autonomous vehicle, comprising:
  at the autonomous vehicle:
    determining a set of secrets to request at a secrets manager, wherein respective secrets of the set of secrets each include private digital authentication information for accessing a respective device in the autonomous vehicle, wherein each respective device has a data-configurable list of secrets to fetch;
    transmitting a request for the set of secrets from the secrets manager to a central computing system secrets authenticator configured to provide secrets to a fleet of vehicles including the autonomous vehicle;
    receiving, at the secrets manager on the autonomous vehicle, the set of secrets from the central computing system secrets authenticator;
    saving, by the secrets manager, the set of secrets in an onboard memory;
    providing access to respective secrets of the set of secrets to the respective devices in the autonomous vehicle, wherein the respective devices access the respective secrets in the onboard memory; and
  at the central computing system secrets authenticator:
    identifying the autonomous vehicle in a vehicle information database;
    authenticating the autonomous vehicle, based in part on the identification;
    identifying selected secrets from a secrets vault to fulfill the request; and
    transmitting the selected secrets to the secrets manager.

16. The method of claim 15, further comprising, at the autonomous vehicle, transmitting an authentication credential, and wherein, at the central computing system secrets authenticator, authenticating the autonomous vehicle is based in part on the authentication credential.

17. The method of claim 15, further comprising, at the autonomous vehicle, receiving, at the secrets manager, the selected secrets from the central computing system secrets authenticator.

18. The method of claim 17, further comprising, at the autonomous vehicle, saving the selected secrets to a memory.

19. The method of claim 18, further comprising, at the autonomous vehicle, accessing at least one selected secret from the memory and registering a device.

20. The method of claim 15, wherein transmitting the selected secrets includes transmitting at least one of a certificate, a password, an encryption key, a decryption key, and an authentication key.

* * * * *